(12) United States Patent
Tatebe

(10) Patent No.: US 7,696,667 B2
(45) Date of Patent: Apr. 13, 2010

(54) SPLIT STATOR OF ELECTRIC MOTOR

(75) Inventor: Katuhiko Tatebe, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 381 days.

(21) Appl. No.: 11/555,898

(22) Filed: Nov. 2, 2006

(65) Prior Publication Data

US 2007/0114878 A1  May 24, 2007

(30) Foreign Application Priority Data

Nov. 21, 2005  (JP) ............................. 2005-335302

(51) Int. Cl.
*H02K 1/12* (2006.01)
(52) U.S. Cl. ...................... 310/259; 310/216
(58) Field of Classification Search ................. 310/259, 310/216, 218, 43
See application file for complete search history.

(56) References Cited

U.S. PATENT DOCUMENTS

| | | | |
|---|---|---|---|
| 4,583,019 A * | 4/1986 | Yamada et al. | 310/360 |
| 6,359,355 B1 | 3/2002 | Hartsfield et al. | |
| 6,897,591 B2 * | 5/2005 | Peachee et al. | 310/166 |
| 6,943,479 B2 * | 9/2005 | Laurent et al. | 310/258 |
| 7,015,619 B2 * | 3/2006 | Tanabe et al. | 310/254 |
| 2004/0263015 A1 | 12/2004 | Okada et al. | |
| 2005/0269895 A1 * | 12/2005 | Innami et al. | 310/218 |

FOREIGN PATENT DOCUMENTS

| | | |
|---|---|---|
| CN | 1145544 A | 3/1997 |
| CN | 1467899 A | 1/2004 |
| DE | 22 23 906 | 12/1972 |
| DE | 696 15 737 T 2 | 5/2002 |
| EP | 0 629 034 A2 | 12/1994 |
| JP | 8-265995 | 10/1996 |
| JP | 2000-209793 | 7/2000 |
| JP | 2000-333399 | 11/2000 |
| JP | 2001-258215 | 9/2001 |
| JP | 2003-284269 | 10/2003 |
| JP | 2003-284277 | 10/2003 |
| WO | WO 95/12912 | 5/1995 |

* cited by examiner

*Primary Examiner*—Nguyen N Hanh
(74) *Attorney, Agent, or Firm*—Oblon, Spivak, McClelland, Maier & Neustadt, L.L.P.

(57) ABSTRACT

A stator of an electric motor is formed by a plurality of split stators that are divided in a circumferential direction of the cylindrical stator. Each split stator comprises a yoke portion that is divided in the circumferential direction, a tooth portion that extends from the yoke portion a in a radial direction, and a coil wound on the tooth portion. The coil is pressed into the coil-housing portion, defined by the yoke portion and the tooth portion, by a press die. While the coil is pressed into the coil-housing portion by the press die, the coil may be covered by, for example, being integrated with a resin. Thus, the risk of damaging the coating of the coil is significantly reduced, the coil density is improved, and good circularity of the stator is ensured.

6 Claims, 5 Drawing Sheets

SPLIT STATOR OF ELECTRIC MOTOR

INCORPORATION BY REFERENCE

The disclosure of Japanese Patent Application No. 2005-335302 filed on Nov. 21, 2005 including the specification, drawings and abstract is incorporated herein by reference in its entirety.

BACKGROUND OF THE INVENTION

1. Field of the Invention

The invention relates to a stator of an electric motor and, more particularly, to a split stator of an electric motor whose stator is formed by combining split stators.

2. Description of the Related Art

An example of split stators of an electric motor of this kind is a set of split stators that have a shape obtained by dividing a cylindrical stator in a circumferential direction, each split stator comprising a yoke portion that is divided in the circumferential direction, a tooth portion extending in a radial direction from the yoke portion, and a coil wound on the tooth portion, which is described in, for example, Japanese Patent Application Laid-Open Publication No. 2003-284269.

In the split stator described in Japanese Patent Application Laid-Open Publication No. 2003-284269, the coil is not covered with a cover. Therefore, when split stators are combined, there is a risk that the coils thereof may interfere with each other resulting in damage to the coating of the coil. In particular, the risk of interference and damage increase significantly when the coil is wound up on the outside of the coil housing portion in order to improve the coil density.

Furthermore, in this case, the interference between coils makes it difficult to bring the circumferential-direction end surfaces of yoke portions into contact, leading to a risk of failing to secure good circularity of the stator. In addition, if the circularity of the stator is not secured, the variations in the magnetic resistance of the yoke portions increase, greatly affecting the cogging torque (pulsating torque). Therefore, in order to avoid damaging the coil coating and secure good circularity of the stator, it is necessary to house the coil in the coil housing portion with an increased margin, by reducing the wire diameter of the coil, or reducing the number of loops of the coil, etc, thus resulting in a problem of failing to improve the coil density.

SUMMARY OF THE INVENTION

The invention provides split stators for an electric motor that do not damage the coating of the coil when the split stators are combined. The split stators according to the invention are also able to improve the density of the coils while securing good circularity of the stator.

In particular, an aspect of the invention provides a split stator in which a cylindrical stator is formed by a plurality of split stators that are divided in a circumferential direction of the cylindrical stator, each stator comprising a yoke portion that is divided in the circumferential direction, a tooth portion that extends from the yoke portion in a radial direction, and a coil wound on the tooth portion. The split stator of the electric motor is characterized in that the coil housed in a coil-housing portion, defined by the yoke portion and the tooth portion, is covered with a cover that covers the coil-housing portion.

In the split stator of the electric motor, the coil housed in the coil-housing portion is covered using a cover that covers the coil-housing portion. Therefore, when the split stators of the invention are combined, damage to the coil coating can be prevented since the cover protects each coil.

The coil housed in the coil-housing portion may be integrated with a resin that serves as the cover. In this case, the split stator may be produced by, for example, a method that includes: winding a predetermined amount of the coil on the tooth portion up to an outside of the coil-housing portion; pressing the coil wound on the tooth portion up to the outside of the coil-housing portion into the coil-housing by a press die; and integrating the coil with a resin by injecting the resin into the coil-housing portion while the coil is pressed into the coil-housing portion by the press die.

In this case, even if a predetermined amount of the coil is wound up to the outside of the coil-housing portion in order to improve the coil density, the coil wound up to the outside of the coil-housing portion is pressed into the coil-housing portion by the press die, and then the coil is integrated with the resin while the pressed-in state is maintained. Therefore, when the split stators are combined, the interference between the coils is avoided, so that the split stators can be favorably combined with the circumferential-direction end surfaces of the yoke portions of the split stators contacting each other. Hence, the coil density can be improved while good circularity of the stator is secured.

Furthermore, a recessed portion may be formed at an end surface of the cover in the circumferential direction, and when the split stators are combined, the coils of adjacent split stators may face each other in the circumferential direction with a void space formed therebetween by the recess portions. In this case, for example, the press die may be provided with a protrusion portion for forming the recess portion in the circumferential-direction end surface of the resin.

In this case, even if the coating of the coil is damaged, the insulation failure between adjacent coils in the state where split stators are combined is effectively prevented because the adjacent coils face each other with the void space therebetween. Thus, it is possible to improve the insulation characteristic.

Furthermore, the void space may be provided with an insulation material. In this case, even if the coating of the coil retained in the coil housing portion is damaged, the insulation failure between adjacent coils in the state where split stators are combined is more effectively prevented because the adjacent coils face each other with the insulation material present therebetween. Thus, it is possible to further improve the insulation characteristic. Furthermore, since the insulation material is present between the coils, good insulation effect will be secured even if the volume of the void space is decreased. Therefore, in this case, since the reduction in the volume of the void space means a corresponding increase in the volume of the coil-housing portion, it is possible to improve the coil density while securing good insulation effect.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 5 is a perspective view of the second embodiment of the split stator of the invention.

DETAILED DESCRIPTION OF THE INVENTION

Figure 1:
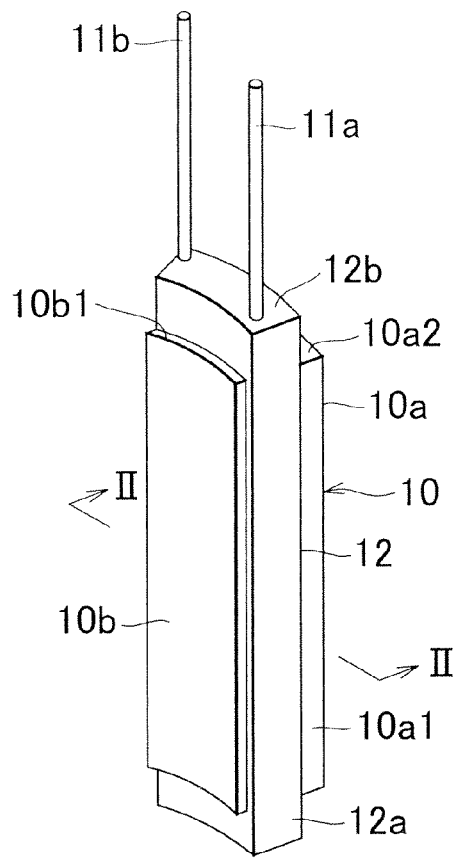
FIG. 1 is a perspective view showing a first embodiment of the split stator of the invention.
Figure 2:
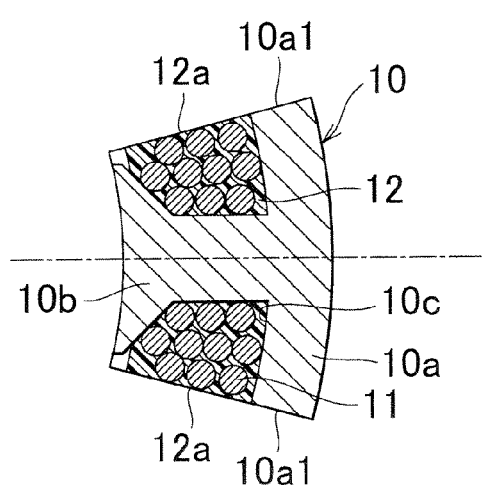
FIG. 2 is a sectional view taken on line II-II of FIG. 1.

Embodiments of the invention will be described hereinafter with reference to the drawings. FIGS. 1 and 2 show a first embodiment of the split stator according to the invention. A plurality of split stators 10 (e.g., twelve) in accordance with the first embodiment are combined to form a cylindrical stator (three-phase motor stator) (see FIG. 6).

Each split stator 10 is formed by stacking electromagnetic steel plates in a longitudinal direction (direction of an axis of the stator) into a block shape. The split stator 10 has a yoke portion 10a that has a fan shape in section, a tooth portion 10b that extends integrally from the yoke portion 10a in an inwardly radial direction, and a coil 11 wound on the tooth portion 10b.

The tooth portion 10b is designed to face a permanent magnet (not shown) disposed on an outer peripheral surface of a rotor (not shown) with a predetermined air gap therebetween when the split stators 10 are combined. The coil 11 is formed of a copper wire whose outer periphery is provided with an insulating coating. The coil 11 is retained in a recess-shaped coil housing portion 10c defined by the yoke portion 10a and the tooth portion 10b, integrally with a resin 12 provided as a cover.

The resin 12 has a fan-like sectional shape that has an outer periphery in the vicinity of the position of an inner periphery of the yoke portion 10a. Two opposite end surfaces 12a of the resin 12 in the circumferential direction are substantially flush respectively with two opposite end surfaces of the yoke portion 10a in the circumferential direction. The resin 12 is also formed so that two opposite end surfaces 12b thereof in the axial direction (end surfaces in the longitudinal direction) are respectively protruded outward in the axial direction a predetermined amount from opposite end surfaces 10a2, 10b1 of the yoke portion 10a and the tooth portion 10b in the direction of the axis. In addition, an end portion 11a and another end portion 11b of the coil 11 extend out from one of the two axial-direction end surfaces 12b of the resin 12.

Figure 3A:
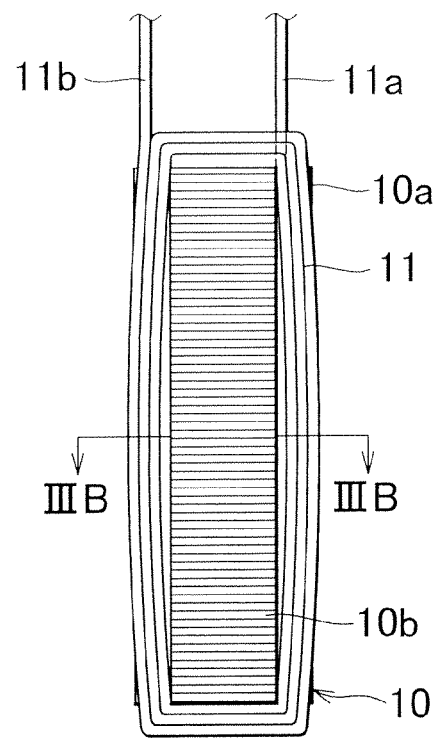
FIG. 3A is a front view of a coil wound on a tooth portion through a coil winding step.
Figure 3B:
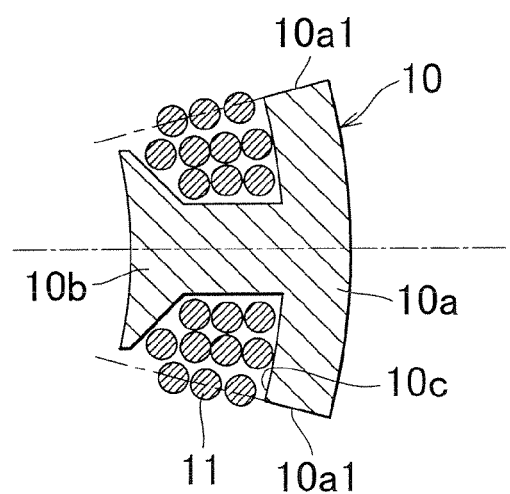
FIG. 3B is a sectional view taken on line IIIB-IIIB of FIG. 3A.

The above-described split stator 10 is produced through steps schematically shown in FIG. 3A to FIG. 3D. In a coil-winding step shown in FIG. 3A, the wire of the coil 11 supplied from a nozzle of a predetermined coil winder is array-wound on the tooth portion 10b. As shown in FIG. 3B in an exaggerated manner, in the vicinity of an intermediate portion of the split stator 10 where the winding bulge becomes greatest, a predetermined amount of coil wire is wound up to the outside of the coil housing portion 10c (outward of the circumferential-direction end surfaces 10a1 of the yoke portion 10a in the circumferential direction).

Figure 3C:
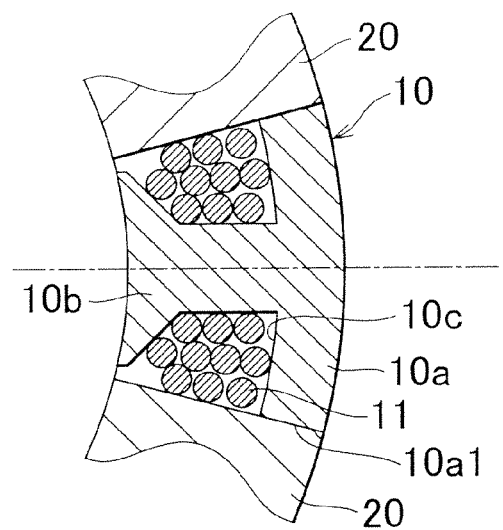
FIG. 3C is a plan sectional view showing a state where the coil has been pressed into a coil housing portion through a press-in step.

In a press-in step shown in FIG. 3C, the coil 11 wound on the tooth portion 10b up to the outside of the coil housing portion 10c is pressed into the coil housing portion 10c by press dies 20. The press dies 20 are moved until they contact the circumferential-direction end surfaces 10a1 of the yoke portion 10a. As the press dies 20 move, the coil 11 is displaced inward in the circumferential direction so as to reduce the spaces between wire loops while substantially maintaining the array-wound state. This increases the coil density. In addition, a construction is provided such that the coil 11 is pressed straight in the direction of the diameter of the coil wire by the press dies 20. Thus, when the compression is performed by the press dies 20, the shearing of the wire of the coil 11 between adjacent loops is avoided, and the coating of the wire of the coil 11 is less likely to be damaged.

Figure 3D:
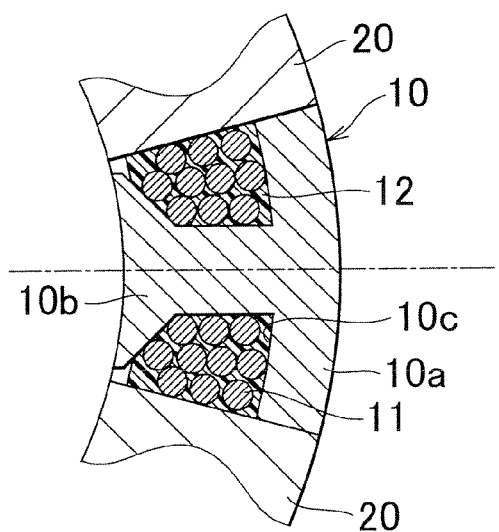
FIG. 3D is a plan sectional view showing a state where the coil has been retained in the coil housing portion through a resin molding step.

In a resin molding step shown in FIG. 3D, while the coil 11 has been pressed into the coil housing portion 10c by the press dies 20, the resin 12 is injected into the coil housing portion 10c, so that the coil 11 is integrated with the resin 12. That is, the press dies 20 are designed to serve also as resin molding dies. In addition, the resin 12 used herein is a resin with high heat conductivity and high insulation characteristic, for example, epoxy resin.

After the resin molding step shown in FIG. 3D, the press dies 20 are removed. In this manner, a split stator 10 whose coil 11 is retained within the coil housing portion 10c as shown in FIG. 2 is obtained.

In the split stator 10 of the first embodiment constructed as described above, the coil 11 housed in the coil housing portion 10c is covered with the resin 12 that covers the coil housing portion 10c. Therefore, when the split stators 10 are combined, damage to the coating of the coil 11 is prevented since the coil 11 is protected by the resin 12.

Furthermore, in the split stator 10 of the first embodiment, if a predetermined amount of the coil 11 is wound up to the outside of the coil housing portion 10c in order to improve the coil density, the coil 11 wound up to the outside of the coil housing portion 10c is pressed into the coil housing portion 10c by the press dies 20. Then, while the pressed-in state is maintained, the coil 11 is integrated with the resin 12. Therefore, when the split stators 10 are combined, the interference between the coils 11 is avoided, so that the split stators 10 can be favorably combined with the circumferential-direction end surfaces 10a1 of the yoke portions 10a of the split stators 10 contacting each other. Hence, the coil density can be improved while good circularity of the stator is secured.

Furthermore, the resin 12 used in the split stator 10 of the first embodiment is a resin with high heat conductivity. Therefore, after the split stators 10 are combined, heat generated during electrification of the coils 10 is efficiently released into the atmosphere via the yoke portions 10a and the tooth portions 10b. Furthermore, the resin 12 used herein is a resin with high insulation characteristic. Therefore, even if the coating of the coil 11 is damaged during the coil winding step, the press-in step, etc., the inter-phase shortcircuit (inter-phase insulation failure) between adjacent coils 11 is effectively prevented.

Figure 4:
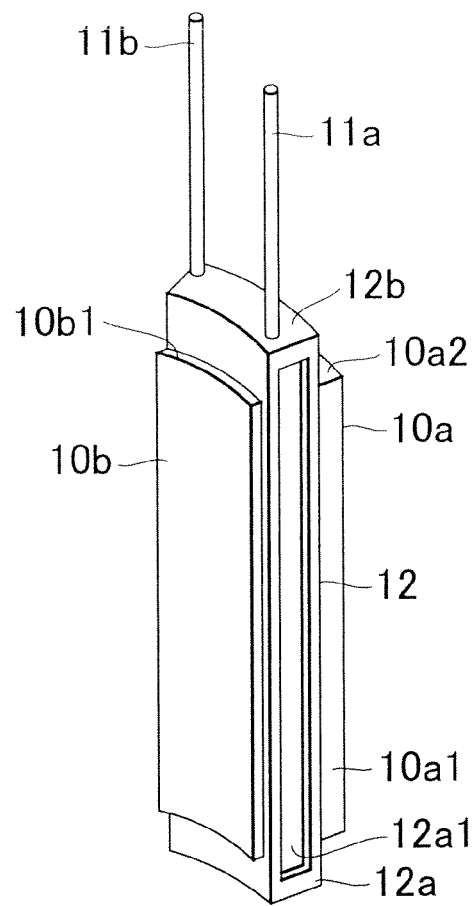
FIG. 4 is a perspective view showing a second embodiment of the split stator of the invention.
Figure 5:
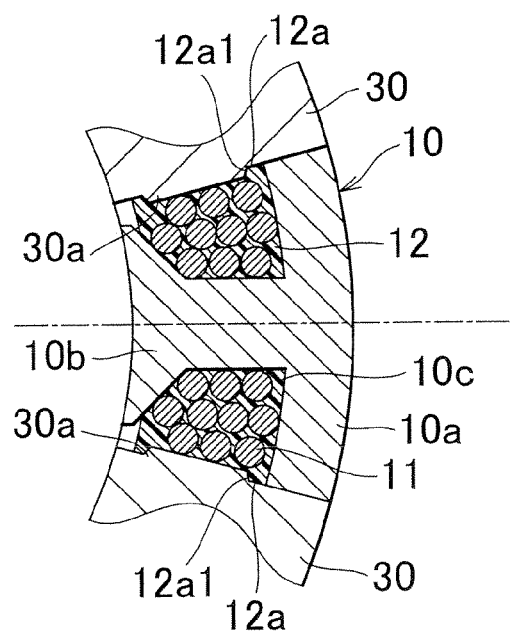
FIG. 5 is a plan sectional view showing a state where the coil has been retained in the coil housing portion through the resin molding step, one of the split stator production steps shown in FIG. 4.
Figure 6:
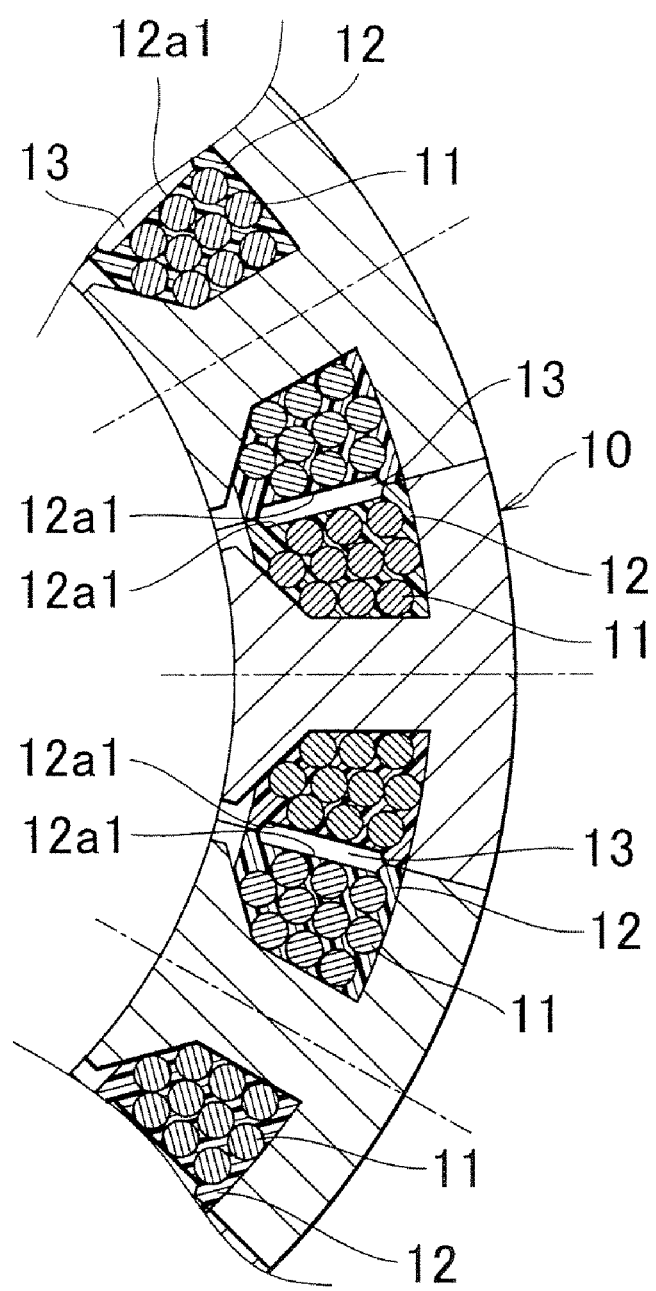
FIG. 6 is a plan sectional view showing a portion of a stator formed by combining split stators as shown in FIG. 4 into an annular arrangement.

The split stator 10 of the first embodiment is designed so that when the split stators 10 are combined, the circumferential-direction end surfaces 12a of the resins 12 of adjacent split stators 10 contact each other (see FIG. 2). However, this is not restrictive. For example, a construction as shown in FIGS. 4 to 6 is also possible. That is, each circumferential-direction end surface 12a of a resin 12 is slightly receded inward in the circumferential direction so as to form a recess portion 12a1 such that when the split stators 10 are combined, the recess portions 12a1 of adjacent split stators 10 form a void space 13. Other constructions of the second embodiment shown in FIGS. 4 to 6 are substantially the same as in the first embodiment. The same members and the like as in the first embodiment are represented by the same reference characters, and will not be described again.

In the second embodiment, instead of the above-described press dies 20, press dies 30 as shown in FIG. 5 are used to execute the press-in step. Then, the resin molding step is accordingly executed. Each press die 30 is provided with a protrusion portion 30a for forming the recess portion 12a1 in a corresponding one of the circumferential-direction end surfaces 12a of the resin 12.

After the split stators 10 are removed from the press dies 30 and combined, adjacent coils 11 facing each other are separated by the void space 13 as shown in FIG. 6. Therefore, even if the coating of the coil 11 retained in the coil housing portion 10c is damaged, the inter-phase shortcircuit (inter-phase insulation failure) between adjacent coils 11 is effectively prevented, and the insulation characteristic improves.

Although in the second embodiment, the split stators are designed so that adjacent coils 11 facing each other are separated by a void space 13, the void space 13 may be modified. For example, an insulation material in a paste form may be applied to the void space 13. According to this modified embodiment, even if the coating of the coil 11 retained in the coil housing portion 10c of a split stator 10 is damaged, the inter-phase shortcircuit (inter-phase insulation failure) between adjacent coils 11 in the arrangement of split stators 10 combined is effectively prevented because adjacent coils 11 face each other with the insulation material present therebetween. Hence, the insulation characteristic further improves.

Furthermore, in the foregoing modified embodiment, because the insulation material is present between the coils, good insulation effect will be maintained even if the volume of the void space 13 is reduced. In this case, since the reduction in the volume of the void space 13 means a corresponding increase in the volume of the coil housing portion 10c, it is possible to improve the coil density while maintaining good insulation effect.

Although in both the first embodiment and the second embodiment a resin 12 is used as a cover for covering the coil housing portion 10c, the material that may be used as a cover is not limited to a resin 12. That is, any material that is able to maintain a pressed-in or packed state of the coil 11 in the coil housing portion 10c may be appropriately selected in the reduction of the invention to practice.

What is claimed is:

1. A split stator for an electric motor comprising:
   a yoke portion that is divided in a circumferential direction of a cylindrical stator of the electric motor,
   a tooth portion that extends from the yoke portion in a radial direction of the cylindrical stator, and
   a coil wound on the tooth portion,
   wherein the coil is housed in a coil-housing portion defined by the yoke portion and the tooth portion and is covered with a cover that covers the coil-housing portion, and the cylindrical stator is formed by a plurality of split stators that are divided in a circumferential direction of the cylindrical stator,
   wherein a recessed portion is formed at an end surface of the cover, in the circumferential direction, and when the split stators are combined, the coils of adjacent split stators are separated, in the circumferential direction, by a void space formed by the recessed portions, and
   wherein the cover comprises a resin and the coil is integrated with the resin.

2. The split stator of the electric motor according to claim 1, further comprising an insulation material, provided in the void space between the coils of adjacent split stators.

3. The split stator of the electric motor according to claim 2, wherein the insulation material comprises a paste.

4. A method of producing a split stator of the electric motor as recited in claim 1, comprising:
   winding a predetermined amount of the coil on the tooth portion up to an outside of the coil housing portion;
   pressing the coil wound on the tooth portion up to the outside of the coil housing portion into the coil housing portion by a press die; and
   integrating the coil with a resin by injecting the resin into the coil housing portion while the coil is pressed into the coil housing portion by the press die.

5. The split stator of the electric motor according to claim 1, wherein the resin is an epoxy resin.

6. The split stator of the electric motor according to claim 1, wherein resin on a first side of the recessed portion is directly exposed to resin on a second side of the recessed portion that is opposite the first side.

* * * * *